United States Patent Office 3,600,429
Patented Aug. 17, 1971

3,600,429
PRODUCTION OF ORGANIC ESTERS IN THE PRESENCE OF PALLADIUM ON AN ALUMINA SUPPORT IN SPINEL FORM
Walter Kronig, Leverkusen, Germany, and Bruno Georg Gustav Frenz, deceased, late of Leverkusen, Germany, by Waltraud Evelin Ursula Frenz, acting legal representative, assignors to Farbenfabriken Bayer Aktiengesellschaft, Leverkusen, Germany
No Drawing. Continuation-in-part of applications Ser. No. 370,360, May 26, 1964, Ser. No. 472,734, July 16, 1965, Ser. No. 506,263 and Ser. No. 506,282, both Nov. 3, 1965. This application Dec. 19, 1966, Ser. No. 603,710
Int. Cl. C07c 67/04
U.S. Cl. 260—475N
4 Claims

ABSTRACT OF THE DISCLOSURE

An improved process for preparing organic acetates and esters by reacting an organic acid, oxygen and an unsaturated compound in the presence of a novel catalyst comprising palladium supported on a spinel containing carrier.

---

This application is a continuation-in-part of copending applications Ser. No. 370,360, filed May 26, 1964, Ser. No. 506,263, filed Nov. 3, 1965, Ser. No. 472,734, filed July 16, 1965, and Ser. No. 506,282, filed Nov. 3, 1965, all now abandoned.

The invention relates to new and useful improvements in the production of organic acetates and esters.

It has been proposed to produce organic acetates, such as vinyl acetate, or organic esters, by reacting an organic acid with oxygen and an unsaturated compound, such as an olefin or alkyl benzene in the presence of a heterogeneous catalyst. For producing organic acetates, acetic acid is used as the organic acid and for producing the esters, aliphatic acids higher than acetic acid or aromatic acids are used. The reaction is generally effected at a temperature between 50 to 250° C., and while the same may be effected in the liquid, or liquid-gas phase, the same is preferably effected in the gas phase. The oxygen required for the reaction is generally present in the form of air, though a gas with a higher oxygen content may be used.

The catalysts may be utilized on a support, as for example, an aluminum oxide or aluminum silicate support.

It is an object of this invention to improve the results in the above described process.

A further object of this invention is an improved catalyst system for the above described process.

These and still further objects will become apparent from the following description:

In accordance with the invention we have surprisingly discovered that substantially improved results are obtained in the above described process for preparing organic acetates or esters if the palladium catalyst used in the reaction is supported on a spinel-containing support. Preferably the palladium is supported on an aluminum oxide carrier at least 20%, and most preferably at least 40% of which is in the form of spinel.

The spinel-containing support or carrier material used in accordance with the invention preferably has a surface area as measured by B.E.T. of from 10 to 100 m.²/g. Most preferably the support has a surface area below 80 m.²/g.

The reaction as mentioned is preferably effected as a vapor phase reaction and may be carried out in accordance with the fixed bed, moving bed, or fluidized bed principle.

In order to prepare the spinel-containing support or carrier in accordance with the invention aluminum oxide is first converted to spinel form. For this purpose it is possible, for example, to start from highly active aluminum oxide in the form of lumps, cylinders, pellets, or the like, having an intrinsic surface area of from 200 to 350 m.²/g., and to impregnate the same with an aqueous salt solution of the spinel-forming metal to be used. As spinel-forming metals there may be mentioned lithium, beryllium, magnesium, zinc, manganese, iron, cobalt, copper, aluminum, chromium or nickel. Where lithium is used the same should be in the monovalent state, whereas manganese, zinc, magnesium, iron, cobalt and nickel should be in the divalent state and whereas aluminum, chromium and iron should be in the trivalent state (see Orgel, "An Introduction to Transition Metal Chemistry: Ligand Field Theory," 1960, pages 77 and 78 and E. W. Gorter, "Philips Research Report," 9, 1954, pages 308 to 320 wherein such spinels are described). Thus, for example, in connection with lithium the aluminum should be impregnated with an aqueous lithium hydroxide solution. The impregnated carrier is then dried. The salts used for the impregnation are then preferably converted to oxides by heating, as for example, to a temperature between 250 to 650° C., with, if desired, the addition of oxygen-containing gases or steam. The spinel is then formed by heating the product to a temperature between about 900 to 1300° C. for a period of from 2 to 20 hours. It is also possible, particularly where lithium is used as the spinel-forming metal to impregnate the aluminum oxide several times with intermediate dryings to produce a complete spinel. Where salts are used for the impregnation, it is also possible to repeat the impregnation several times with intermediate decomposition stages for the salt.

The spinel-containing carrier may also be produced starting from fine, granuled aluminum oxide having a large intrinsic surface and mixing this aluminum oxide with a solution of the spinel-forming metal compound. In this case there may be also at the outset an amount of solution of the spinel-forming metal which will provide the intended subsequent degree of conversion to spinel. After the drying the composition can then be shaped in the desired form, as for example, by pressing into continuous lengths which are subsequently broken or cut to the desired size, or by pressing in the form of pellets. The pressing may, of course, be aided by the addition of lubricants. Where salts are used for the impregnation, the impregnated material can be heated wtih an intermediate decomposition stage, as described above.

It is also possible to form the spinel-carriers by precipitating metal aluminate from aqueous solutions of aluminum salts as for example, sodium aluminate by the addition of compounds of the spinel-forming metals. These metal aluminates can be freed from adhering soluble salts by washing, and the resulting product may be transformed into the spinel by thermal treatment. It is furthermore possible to produce mixed spinels by using several spinel-forming metal compounds. In each case the optimum treating temperatures and times may be empirically determined by preliminary tests which may also be used in order to establish conditions for obtaining the optimum porosity of the prepared catalyst supports.

The spinel-containing supports may be used per se, or in admixture of other carrier materials, for example, aluminum silicates, or silicas, or aluminum oxide which is not in spinel-form. In all cases it is, however, preferable that the carrier material has an intrinsic surface below 100 m.²/g., and preferably below 80 m.²/g., as for example, between 20 and 80 m.²/g.

The palladium is then supplied to the support in quantities, for example between about 0.1 and 10% by weight, and preferably between 0.5 and 5% by weight. The application of palladium may be effected in any known manner, but is preferably effected by first impregnating the supports with an aqueous palladium salt solution followed by reduction, as for example with a hydrazine hydrate in alkali solution. As palladium salts which may be used, nitrates or other inorganic salts, and acetates may be mentioned. The reduction of the salt to the metal may also be effected by treatment with hydrogen at elevated temperature.

When using the catalyst in the form of a fixed bed, the same may be in the form of pellets, cylinders, balls, or lumps having a size between about 2 to 8 mm., and preferably 3 to 5 mm. When utilized in the form of a moving bed, the catalysts preferably have a spherical form, and when used in the form of a fluidized bed, the same are preferably in microspheroidal form having a size between 20 to 80μ.

It has been found preferable to use as cocatalysts alkali or alkaline earth metal salts of organic acids, and preferably organic acids which are used in the process, or alkali or alkaline earth metal phosphates. For use in a gas phase reaction the cocatalyst is preferably applied to the supported catalyst in amount of, for example, between 0.5 and 10%, and preferably 1 to 5% by weight based on the support. The application of the cocatalyst is preferably effected by impregnating the support containing the palladium metal with the salt or phosphate followed by drying. It is also possible to use inorganic salts, as for example, carbonates, which are converted during the process into the salts of the organic acids used and which thus act as the cocatalyst. As specific examples of the cocatalysts there may be mentioned acetates or the corresponding salts of the higher organic acids of lithium, sodium, potassium, magnesium, or calcium, or the corresponding phosphates.

When the reaction is effected in the liquid phase, the cocatalyst salts or phosphates may be admixed with the organic acid used as for instance in the form of .2 to 2 molar solutions in the acid.

As organic acids which may be used in the reaction, acetic acid or mono- or polyvalent acids, as for example propionic acids, butyric acids, capronic acid, adipic acid, aromatic acids, such as benzoic acid, and phthalic acids such as o-, m- and p-phthalic acids may be used. These acids are preferably used in in concentrated form, as for example, of at least 99% concentration, though lower concentrations, as for example, 70% and below may also be used.

As olefins which may be used in the process, there may be mentioned ethylene and other aliphatic mono-olefins, including propylene, butylenes, pentenes, hexenes and heptenes. As alkyl benzenes which may be used in the place of the olefins, compounds in which the benzene ring contains 1, 2 or 3 alkyl radicals containing up to 4 carbon atoms are preferred. Benzene rings substituted with methyl and ethyl radicals are preferred. Examples of these alkyl benzenes include toluene, benzene and xylenes, including o-, m- and p-xylenes.

While it is preferable to use the unsaturated compounds at a high concentration, as for example, a 99 concentration of ethylene, it is possible to utilize the olefins in admixture with paraffinic hydrocarbons with which they frequently occur in petroleum treatment processes. The mol ratio between the acids and the unsaturated compounds may vary within wide limits, as for example between 0.2:1 and 3.0:1.

The oxygen can be supplied in the form of air, however, particularly with a cyclic flow of reactants it may be desirable to work with concentrated oxygen, preferably about 99% concentration. When operating in the liquid phase, it is preferable to use from about 3.0 to 30 mols of oxygen per 100 mols of unsaturates, whereas when working in the gaseous phase the amount of oxygen in the gaseous mixture of unsaturates, acid and oxygen may amount, for example, from 1 to 40 parts by volume and preferably from 2 to 30 parts by volume. Since only a portion of the gases, and particularly the unsaturates are reacted in a single pass, it may be desirable to effect the process by recycling after separation of the reaction products. As mentioned, the reaction may be carried out at temperatures between 50 and 250° C., and preferably between 100° and 200° C., at normal or elevated pressure, as for example, at a pressure up to 200 atmospheres, and preferably up to 10 atmospheres.

When effecting the process with a fixed catalyst it has been found preferable to utilize a multiple tube reactor surrounded by a boiling cooling liquid to move the heat of reaction produced. As cooling liquid water, methanol or the like may be mentioned. Thus, for example, it is possible to use reaction tubes having an internal width of between 25 to 75 mm., with a length of 1 to 8, and preferably 2 to 6 meters. When operating in accordance with the moving bed principle, it is preferable to use a closed bed the heat of reaction produced being transferred to the catalyst body which may then be cooled down outside the reaction chamber for example with cooler gas. When operating with the fluidized bed the heat of reaction may be transferred to cooling units built in the fluidized bed. The process may also be operated in the trickle phase in which the acids, such as the acetic acid together with the unsaturate, such as the olefin, are present in liquid or gaseous form or in a mixed phase and trickle in an oxygen-containing atmosphere over the catalyst which is arranged in a fixed manner in the reaction chamber. The other reactants also move downwardly over the catalyst. It is also possible to operate with the oxygen and/or the unsaturates being conducted upwardly through the reaction chamber countercurrent to the acid. It is also possible to operate with the catalyst suspended in the liquid phase reaction. It is preferable however, to operate in the gas phase as in this manner higher concentrations of the desired product, as for example, the vinyl acetate is formed and substantially smaller quantities of higher boiling side products are formed.

The reactants are worked up by cooling the same after they leave the reaction chamber so that a major part of the acetic acid and certain other reaction products are liquefied. Those fractions of the reaction product which are not so condensed, as for example acetates or esters can be washed out of the gases leaving the condenser with suitable washing agents, as for example, acids, higher boiling esters, glycols, glycol esters, or the like. Alternately, these products may be liquefied by compression which has the advantage of facilitating separation of carbon dioxide formed as a side product. The reaction products from the condensate, i.e. the organic acetates or esters, may be separated from the water and from the acids by distillation. The acids may be vaporized and recycled to the reaction in vapor form. When operating in the liquid phase the reaction product may be separated by distillation, or where dissolved salts are present in the reaction, the products of the lower boiling point range can first be separated by distillation using, if desired steam or other carrier gases, and salts and products of higher boiling points can be separated from the residue by extraction with an organic solvent, as for example a hydrocarbon.

Where acetic acid is used as the organic acid, organic acetates are obtained as the reaction product. Where ethylene is used as the unsaturate, vinyl acetate is formed. When using other unsaturates, corresponding higher acetates are formed, thus, for example allyl acetate from propylene, methallyl acetate from isobutylene, and benzyl acetate from toluene. When using higher acids organic esters are obtained as for example, vinyl propionate, vinyl butyrate, vinyl benzoate, divinyl adipate, divinyl-o-phthalate, divinyl-p-phthalate, allyl propionate, allyl butyrate, allyl benzoate, di-allyl m-phthalate, methallyl propionate, methallyl butyrate, and di-methallyl-o-phthalate.

The following examples are given by way of illustration and not limitation:

EXAMPLE 1

The catalyst support was prepared as follows: 4 mm. diameter spheres of active aluminum oxide with an internal surface area of 288 m.$^2$/g. were impregnated until saturated with a saturated aqueous solution of magnesium nitrate. By heating the impregnated and dried spheres to 500° C., the magnesium nitrate was decomposed into magnesium oxide. After cooling, this operation was repeated twice. The material thus obtained contained magnesium oxide in a quantity which corresponded to 90% of the amount required for complete spinel formation. This product was then heated for 8 hours to 1050° C. during which time spinel formation was completed. The support thus obtained had an internal surface area of 60 m.$^2$/g. It was impregnated with palladium chloride solution for the preparation of the catalyst. The palladium was then deposited in fine distribution on to the support with alkaline hydrazine hydrate solution and the formed alkaline chloride was washed out. The palladium metal content of the prepared catalyst amounted to 2% by weight. This noble metal catalyst was then impregnated with 2 parts by weight of sodium acetate (as aqueous solution) to 100 parts by weight of the prepared catalyst. The product was then dried at 110° C. in vacuum. 500 cc. of this catalyst were fixedly arranged in a reaction tube with an internal diameter of 22 mm. and a length of 1500 mm. A mixture, in vapour form, of 4.81 mols of ethylene, 1.86 mols of acetic acid, and 0.92 mol of oxygen per hour was then passed downward over the catalyst. The reaction was carried out at 143° C. under normal pressure. 13.0% of the carbon introduced in the form of ethylene was reacted. Of the converted carbon, 88.7% was obtained as vinyl acetate and 11.3% as carbon dioxide.

EXAMPLE 2

Aluminum oxide spheres identical with those of Example 1 were impregnated with aqueous zinc nitrate solution. After being dried, the impregnated spheres were heated to 500° C. so as to decompose the zinc nitrate. The quantity of zinc absorbed on impregnation corresponded to 40% of the theoretical quantity required for spinel formation. The product was then heated for 6 hours to 1050° C. The impregnation of this support (which had an internal surface area of 46 m.$^2$/g.) with palladium chloride, the subsequent reduction to metallic palladium and coating with sodium acetate, took place in the manner described in Example 1. The apparatus used was also the same as in Example 1. A mixture in vapor form, of 4.59 mols ethylene, 1.88 mols acetic acid and 0.86 mol oxygen per hour was then passed over the catalyst at a reaction temperature of 144° C. and under normal pressure. 16.6% of the carbon introduced in the form of ethylene had reacted. Of the reacted carbon, 90.6% was obtained as vinyl acetate and 9.4% as carbon dioxide.

EXAMPLE 3

(a) To prepare the catalyst support, a cobalt aluminate was precipitated from a sodium aluminate solution with equivalent quantities of a cobalt nitrate solution. The cobalt aluminate was washed free from sodium ions and dried. The powder was then heated for 6 hours to 900° C. The internal surface area of the spinel thus obtained was 46 m.$^2$/g. Palladium metal and sodium acetate were then applied successively to this support in the manner described in Example 1. The dried catalyst was made into 4 mm. pellets in a press and was introduced as such into the reactor. The reaction was carried out in the same way as in the preceding example at a temperature of 145° C. and under atmospheric pressure. A mixture in vapor form of 4.66 mols of ethylene, 1.89 mols of acetic acid and 0.86 mol of oxygen was passed hourly over the catalyst. 11.6% of the carbon introduced as ethylene had reacted. Of the reacted carbon, 88.1% was obtained as vinyl acetate, and 11.9% as carbon dioxide.

(b) If the catalyst is prepared as described above, but if instead of the 2 parts by weight of sodium acetate there are used 4 parts by weight of potassium acetate and if the process of Example 3(a) is then carried out at 138° C., instead of the 145° C., then 11.5% of the carbon introduced as ethylene is reacted and of the reacted carbon 93% was obtained as vinyl acetate and 7% as carbon dioxide.

(c) If instead of the sodium acetate containing catalyst, used in Example 3, there is used a catalyst containing 1.5 parts by weight of trisodium phosphate or 2 parts by weight of tripotassium phosphate and if the reaction described in Example 3(a) is carried out at 140° C., then 15% of the carbon introduced as ethylene, is reacted. Of the reacted carbon 89% was obtained as vinyl acetate and 11% as carbon dioxide.

EXAMPLE 4

1 liter of the catalyst described in Example 2 was introduced into a V4A steel tube with an internal diameter of 25 mm. and a length of 2100 mm. The tube was surrounded by boiling water at 120° C. In a test lasting more than a month, a mixture in vapor form of 8.77 mols of ethylene, 3.42 mols of acetic acid and 1.76 mols of oxygen was passed hourly over the catalyst under normal pressure. 14.9% of the carbon introduced as ethylene had reacted. Of the reacted carbon, 92.4% was obtained as vinyl acetate and 7.6% as carbon dioxide.

EXAMPLE 5

The catalyst support was prepared in the following way: balls with a diameter of 4 mm. and consisting of active aluminum oxide with an intrinsic surface area of 288 m.$^2$/g. were impregnated at normal temperature with a quantity of saturated aqueous solution of zinc nitrate corresponding to a 40% formation of zinc spinel. By heating the impregnated and dried balls to 500° C., the zinc nitrate was decomposed to the oxide. This product was then heated for 12 hours to 1050° C., completing the spinel formation. The support thus obtained had an intrinsic surface area of 36 m.$^2$/g. To prepare the catalyst, the spinel was impregnated with palladous chloride. The palladium was then precipitated with alkali hydrazine hydrate solution in finely divided form on the support. The palladium content of the prepared catalyst was 2% by weight, 100 cc. each of this catalyst were then impregnated with 4.7 parts by weight of sodium propionate or magnesium propionate as aqueous solution. It was then dried at 110° C. in vacuo. 500 cc. of this catalyst were introduced into a tube with an internal diameter of 22 mm. and a length of 1500 mm. A mixture of 4.5 mols of ethylene, 1.45 mols of propionic acid and 0.85 mol of oxygen per hour was conducted in vapor form and in a downward flow over this catalyst arranged in a fixed position in the reaction chamber. The reaction temperature was 145° C. and the operation took place at normal pressure. 8.8% of the carbon introduced as ethylene were reacted. Of the reacted carbon, 80.6% were obtained as vinyl propionate and 19.4% as carbon dioxide.

EXAMPLE 6

The catalyst support was prepared by impregnating aluminum oxide balls having a diameter of 4 mm. and an intrinsic surface area of 288 m.$^2$/g. with an aqueous lithium formate solution. The balls were subsequently dried and the lithium formate was decomposed by heating to 500° C. The formation of the lithium spinel (2.7% Li) was completed by heating to 1150° C. for 8 hours. The support had an intrinsic surface area of 22 m.$^2$/g.

The support was then impregnated with an aqueous sodium palladium chloride solution ($Na_2PdCl_4$) and the palladium subsequently precipitated with an alkaline hydrazine hydrate solution in a state of fine division on the support. The palladium content of the catalyst amounted to 2 g. of palladium per 100 ml. of catalyst. 2 g. of sodium acetate were then applied to 100 ml. each of the catalyst by impregnating with an aqueous sodium acetate solution. After drying at 110° C. in vacuo, 500 ml. of the final catalyst were introduced into the arrangement described in Example 5. A mixture of 3.6 mols of butylene (20% butylene-1, 80% butylene-2), 1.62 mols of propionic acid and 1.2 mols of oxygen was conducted per hour in vapor form and in a downward flow over this catalyst arranged in a fixed position in the reaction chamber. The reaction temperature was 148° C., the reaction pressure 0.5 atmospheric gauge. 5.6% of the carbon introduced as butylene were reacted. Of the reacted carbon, 78.2% were obtained as a mixture of isomeric butenyl propionate, 5.6% as ethyl-methylketone, 3.4% as croton aldehyde and 12.8% as carbon dioxide.

Similar results are obtained when using instead of n-butene, propylene, isobutylene, n-pentene or n-hexene as olefins.

EXAMPLE 7

500 ml. of the catalyst used in Example 6 were introduced into the arrangement described in Example 5 with the following difference:

100 ml. of each the catalyst were impregnated with 5 g. of sodium capronate instead of sodium acetate. Instead of 5 g. of sodium capronate, 4 g. of barium capronate may also be used to impregnate the catalyst.

A mixture of 2.0 mols of heptene-1, and 0.5 mol of capronic acid and air corresponding to 0.9 mol of oxygen was conducted per hour in vapor form and in a downward flow over this catalyst arranged in a fixed position in the reaction chamber at a reaction temperature of 160° C. and under atmospheric pressure. 3.8% of the carbon introduced as heptene-1 were reacted. Of the reacted carbon, 65.4% were obtained as a mixture of isomeric heptenyl capronates, 8.5% as higher oxidation products (i.e. methylpentylketone) and 26.1% as carbon dioxide.

EXAMPLE 8

The catalyst of Example 6 to which 5% of sodium propionate had been added was arranged in amount of 250 cc. on a cylindrical wire mesh which was fixed for rotation in an autoclave having a 700 cc. capacity, 1.2 mols of toluene and 0.42 mol of propionic acid were introduced into the autoclave and air corresponding to 0.2 mol of oxygen was fed at a pressure of 55 atm. While rotating the wire mesh the autoclave was heated to 150° C. and left at this temperature for 18 minutes. 5.5% of the carbon introduced as toluene had reacted. Of the unreacted carbon, 75.3% were obtained as benzyl propionate and 6.2% as carbon dioxide.

Similar results are obtained when using instead of toluene, o-, m-, p-xylene or ethyl benzene.

EXAMPLE 9

Example 8 was repeated, except 6% calcium propionate was used in place of the sodium propionate. Similar results were obtained.

EXAMPLE 10

The catalyst support was prepared by impregnating aluminum oxide balls having a diameter of 4 mm. and an intrinsic surface area of 288 m.²/g. with an aqueous lithium formate solution. The balls were subsequently dried and the lithium formate was decomposed by heating to 500° C. The formation of the lithium spinel (2.7% Li) was completed by heating to 1150° C. for 8 hours. The support had an intrinsic surface area of 22 m.²/g.

The support was then impregnated with an aqueous sodium palladium chloride solution ($Na_2PdCl_4$) and the palladium subsequently precipitated with an alkaline hydrazine hydrate solution in a state of fine division on the support. The palladium content of the catalyst amounted to 2 g. of palladium per 100 ml. of catalyst.

250 ml. of this catalyst were introduced into the autoclave described in Example 8. The autoclave was charged with 0.3 mol of phthalic anhydride and 120 ml. of benzene. While rotating the wire mesh, 0.9 mol of propylene and air corresponding to 0.25 mol of oxygen were passed into a total pressure of 61 atm. The autoclave was then heated at 140° C. and left at this temperature for 15 minutes. 4.0% of the carbon introduced as propylene was reacted. From the reacted carbon there were obtained 53.0% as diallyl phthalate, 16.5% as higher oxidation products (i.e. acrolein, acetone) and 30.5% of carbon dioxide.

Similar results are obtained when using instead of phthalic anhydride, terephthalic acid, benzoic acid, butyric acid or adipic acid.

EXAMPLE 11

500 ml. of the catalyst described in Example 2 were introduced into a tube of an inside diameter of 22 mm. and a length of 1500 mm. A mixture of 3.5 mols of hexene-1, 1.2 mols of butyric acid and 0.8 mol of oxygen was conducted per hour in vapor form and a downward flow over this catalyst arranged in a fixed position in the reaction chamber. The reaction was carried out at a temperature of 150° C. and at atmospheric pressure. 4.6% of the carbon introduced as hexene was reacted. From the reacted carbon, there were obtained 57.8% as a mixture of isomeric hexenyl butyrates, 10.5% as higher oxidation products (i.e. methylbutylketone), and 31.7% as carbon dioxide.

EXAMPLE 12

Using the same arrangements as in Example 8, with the catalyst used in Example 10, 1.0 mol of toluene and 0.25 mol of benzoic acid were introduced into an autoclave. Air corresponding to 0.2 mol of oxygen was passed into a pressure of 53 atm. While rotating the wire mesh the autoclave was heated to 150° C. and left at this temperature for 25 minutes. 8.2% of the carbon introduced as toluene had reacted. From the reacted carbon there were obtained 60.4% as benzyl benzoate and 28.8% as carbon dioxide.

EXAMPLE 13

(a) A catalyst was prepared in the same manner as described in Example 1 with the exception that the catalyst contained instead of 2 parts by weight of sodium acetate, 2 parts by weight of calcium acetate. The catalyst thus obtained was then fixedly arranged in a reaction tube as described in Example 1. A mixture in vapor form of 2.08 mols of ethylene, 1.83 mols of acetic acid and 0.42 mol of oxygen per hour was then passed downward over the catalyst. The reaction was carried out at 135° C. under normal pressure. 18% of the carbon, introduced in the form of ethylene, was reacted. Of the converted carbon 88.3% was obtained as vinyl acetate and 11.7% as carbon dioxide.

(b) Similar results as described above, under (a) were obtained by substituting the calcium acetate by magnesium acetate or barium acetate.

While the invention has been described in detail with reference to certain specific embodiments, various changes and modifications which fall within the spirit of the invention will become apparent to the skilled artisan. The invention is therefore only intended to be limited by the appended claims or their equivalent wherein we have endeavored to claim all inherent novelty.

We claim:

1. In a process of preparing a carboxylic acid ester by reacting at 50° C. to 250° C. in a vapor phase a hydrocarbon carboxylic acid containing up to 8 carbon atoms with oxygen and an unsaturated compound selected from the group consisting of hydrocarbon mono-olefins containing up to 7 carbon atoms and alkyl benzenes containing up to 10 carbon atoms in the presence of a supported palladium catalyst containing in the range of 0.1 to 10 weight percent metallic palladium; the improvement comprising using as said catalyst a spinel-containing catalyst having a B.E.T. surface area in the range of 10 to 100 m.²/g. prepared by impregnating a porous alumina having an initial surface area of 200 to 350 m.²/g. with a solution of spinel-forming metal selected from the group consisting of lithium, beryllium, magnesium, zinc, manganese, iron, cobalt, copper, aluminum, chromium and nickel; drying and converting by heating to 900° to 1300° C. for a period of from about 2 to 20 hours said spinel-forming metal and at least 20 weight percent of said alumina to a spinel; impregnating the thus treated alumina with an aqueous solution of a palladium salt; and reducing the impregnated catalyst, converting said palladium salt to a palladium metal, with hydrazine hydrate or hydrogen.

2. The process of claim 1 wherein said spinel containing catalyst is also impregnated with a co-catalyst selected from the group consisting of alkali and alkaline earth metal salts of carboxylic acids, and alkali and alkaline earth metal phosphates.

3. In a process of preparing a carboxylic acid ester by reacting at 50° to 250° C. in vapor phase a carboxylic acid with oxygen and an unsaturated compound selected from the group consisting of mono-olefins and alkyl benzenes in the presence of a supported palladium catalyst containing in the range of 0.1 to 10 weight percent metallic palladium; the improvement comprising using as said catalyst a spinel-containing catalyst having a B.E.T. surface area in the range of 10 to 100 m.²/g. prepared by impregnating a porous alumina having an initial surface area of 200 to 350 m.²/g. with a solution of a spinel-forming metal, drying and converting by heating to 900° to 1300° C. for a period of from about 2 to 20 hours said spinel-forming metal and at least 20 weight percent of said alumina to a spinel; impregnating the thus treated alumina with an aqueous solution of a palladium salt, and reducing the impregnated catalyst, converting said palladium salt to palladium metal with hydrazine hydrate or hydrogen; said unsaturated compound being selected from the group consisting of ethylene, propylene, n-butene, isobutylene, n-pentene, n-hexene, n-heptene, toluene, xylene and ethyl benzene; said carboxylic acid being selected from the group consisting of acetic, propionic, capronic, butyric, benzoic, adipic, and terephthalic acid; and said spinel-forming metal being selected from the group consisting of magnesium, zinc, cobalt and lithium.

4. The process of claim 3 wherein said spinel-containing catalyst is also impregnated within the range of 0.5 to 10 weight percent of a compound selected from the group consisting of sodium acetate, potassium acetate, trisodium phosphate, sodium propionate, magnesium propionate, sodium capronate, barium capronate, calcium acetate, calcium propionate, magnesium acetate and barium acetate.

References Cited
UNITED STATES PATENTS

| | | | |
|---|---|---|---|
| 3,190,912 | 6/1965 | Robinson | 260—497 |
| 3,275,680 | 9/1966 | Holzrichter et al. | 260—497 |

FOREIGN PATENTS

| | | | |
|---|---|---|---|
| 618,071 | 9/1962 | Belgium | 260—497 |
| 638,489 | 2/1964 | Belgium | 260—497 |

JAMES A. PATTEN, Primary Examiner

V. GARNER, Assistant Examiner

U.S. Cl. X.R.

252—430, 437, 455R, 465, 466J, 466R; 260—475R, 476R, 485L, 485N, 488CD, 497A, 597B, 604AC